US006964026B2

(12) United States Patent
Moore et al.

(10) Patent No.: US 6,964,026 B2
(45) Date of Patent: Nov. 8, 2005

(54) METHOD OF UPDATING A SEMICONDUCTOR DESIGN

(75) Inventors: William P. Moore, Winooski, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 09/805,137

(22) Filed: Mar. 14, 2001

(65) Prior Publication Data

US 2001/0008017 A1 Jul. 12, 2001

Related U.S. Application Data

(62) Division of application No. 09/128,503, filed on Aug. 3, 1998, now Pat. No. 6,237,101.

(51) Int. Cl.[7] .............................................. G06F 17/50
(52) U.S. Cl. ...................... 716/1; 716/4; 716/2; 703/21
(58) Field of Search ...................... 716/1, 2, 4; 703/21, 703/14

(56) References Cited

U.S. PATENT DOCUMENTS

| 3,700,873 A | 10/1972 | Yhap ........................ 708/100 |
| 3,918,030 A | 11/1975 | Walker ...................... 712/212 |
| 4,145,736 A | 3/1979 | Yamada et al. ............. 712/212 |
| 4,251,862 A | 2/1981 | Murayama .................. 712/212 |
| 4,472,772 A | 9/1984 | Flora |
| 4,484,268 A | 11/1984 | Thoma et al. |
| 4,594,661 A | 6/1986 | Moore et al. ............... 712/248 |
| 4,641,348 A * | 2/1987 | Neuder et al. .............. 382/100 |
| 4,660,171 A | 4/1987 | Moore et al. ............... 712/212 |
| 4,685,080 A | 8/1987 | Rhodes, Jr. et al. ........ 712/248 |
| 4,713,750 A | 12/1987 | Damouny et al. |
| 4,763,246 A | 8/1988 | Holt et al. .................. 712/212 |
| 4,887,203 A | 12/1989 | MacGregor et al. |
| 5,046,040 A | 9/1991 | Miyoshi |
| 5,084,824 A | 1/1992 | Lam et al. .................... 716/11 |
| 5,093,775 A | 3/1992 | Grundmann et al. ........ 712/212 |
| 5,101,344 A | 3/1992 | Bonet et al. |
| 5,185,868 A | 2/1993 | Tran .......................... 712/217 |

(Continued)

OTHER PUBLICATIONS

C–L. Su et al., Low Power Architecture Design and Compilation Techniques for High–Performance Processors, Compcon Sprin '94, Digest of Papers, pp. 489–498, Feb. 1994.*

(Continued)

Primary Examiner—A. M. Thompson
(74) Attorney, Agent, or Firm—Michael J. LeStrange

(57) ABSTRACT

A microprocessor, method and signal-bearing medium for storing a program for executing the method, includes a microcode unit for outputting control signals, for each of a plurality of instructions, required by the microprocessor for executing the instructions. The microcode unit includes an instruction address input for receiving an instruction address, a control variable input for receiving a control variable corresponding to a current state of the microprocessor, a control signal input for receiving all of the control signals output by the microcode unit for an immediately preceding instruction, and a plurality of embedded logic circuits each dedicated for evaluating one unique type of instruction received by the microcode unit.

4 Claims, 5 Drawing Sheets

U.S. PATENT DOCUMENTS

| | | | |
|---|---|---|---|
| 5,249,273 A | 9/1993 | Yoshitake et al. | 712/210 |
| 5,276,824 A | 1/1994 | Skruhak et al. | |
| 5,299,321 A | 3/1994 | Iizuka | 712/212 |
| 5,371,864 A | 12/1994 | Chuang | 712/206 |
| 5,412,785 A | 5/1995 | Skruhak et al. | 712/230 |
| 5,426,591 A | 6/1995 | Ginetti et al. | 716/6 |
| 5,455,938 A | 10/1995 | Ahmed | 716/5 |
| 5,465,216 A | 11/1995 | Rotem et al. | 716/5 |
| 5,475,824 A | 12/1995 | Grochowski et al. | 712/206 |
| 5,491,640 A | 2/1996 | Sharma et al. | 716/18 |
| 5,515,302 A | 5/1996 | Horr et al. | 358/1.15 |
| 5,517,432 A | 5/1996 | Chandra et al. | 703/14 |
| 5,519,627 A | 5/1996 | Mahmood et al. | 716/18 |
| 5,568,442 A | 10/1996 | Kowalczyk et al. | 365/230.03 |
| 5,572,437 A | 11/1996 | Rostoker et al. | 716/18 |
| 5,581,742 A | 12/1996 | Lin et al. | 716/4 |
| 5,598,348 A | 1/1997 | Rusu et al. | 716/21 |
| 5,615,357 A | 3/1997 | Ball | 703/21 |
| 5,650,938 A | 7/1997 | Bootehsaz et al. | 716/6 |
| 5,680,332 A | 10/1997 | Raimi et al. | 703/13 |
| 5,732,255 A | 3/1998 | Verbauwhede | |
| 5,790,874 A | 8/1998 | Takano et al. | |
| 5,862,148 A | 1/1999 | Typaldos et al. | |
| 5,867,644 A | 2/1999 | Ranson et al. | |
| 6,237,101 B1 * | 5/2001 | Moore et al. | 713/320 |
| 6,397,170 B1 * | 5/2002 | Dean et al. | 703/14 |
| 2001/0009028 A1 * | 7/2001 | Moore et al. | 713/220 |
| 2001/0010082 A1 * | 7/2001 | Moore et al. | 713/200 |
| 2002/0013912 A1 | 1/2002 | Lin | |
| 2003/0070013 A1 * | 4/2003 | Hansson | 710/59 |

OTHER PUBLICATIONS

C.L. Su et al., Saving Power in the Control Path of Embedded Processors, IEEE Design & Test of Comupters, pp. 24–31, Winter 1994.*

Computer Organization and Design– The Hardware/Software Interface; John L. Hennessy and David A. Patterson; Morgan Kaufman Publishers; Second Edition; 1998; pp. B–11 to B–13.

Computer Architecture–A Quantitative Approach; John L. Hennessy and David A. Patterson; Morgan Kaufman Publishers; Fourth Printing; 1990; pp. 205–206.

J. Patrick Brennan, et al. "Low Power Methodology and Design Techniques for Processor Design", 1998, pp. 268–273.

Su et al., "Low Power Architecture Design and Compilation Techniques for High–Performance Processors", IEEE, 1994, pp. 489–498.

Su et al., "Saving Power in the control Path of Embedded Processors", IEEE Design & Test of Computers, 1994, pp. 24–30.

* cited by examiner

METHOD OF UPDATING A SEMICONDUCTOR DESIGN

The present Application is a Divisional Application of U.S. patent Ser. No. 09/128,503 now U.S. Pat. No. 6,237,101 filed on Aug. 3, 1998.

BACKGROUND OF THE INVENTION

1. Field of the Invention

The present invention generally relates to a microprocessor, and more particularly to a microprocessor including a controller in which alternating current (AC) power is reduced as a function of a sequential machine, and a method therefor.

2. Description of the Related Art

Mobile computers (e.g., portable personal computers such as IBM's ThinkPad®), communications devices (e.g., portable, cellular telephone, selective call receiving device (pager) etc.), and other portable device (e.g., "smart" cards, etc.) must be designed for very low power operation and consumption to conserve the limited charge of a battery incorporated into the respective devices. Thus, every operation must minimize the power use for maximum battery life.

Two power components which are candidates for reducing power are the alternating current (AC) power, and the standby power. A primary method of driving the AC power has been through using low-power circuits, and improved technology enabling lower VDD. The standby power has been the primary focus from a logic design and architecture standpoint. The conventional methods have involved different methods of shutting down logic whenever the product is in the standby power mode. Thus, through technology advances and standby shutdown, some power savings have been achieved.

However, a third area of power consumption is the reduction of power while the processor (e.g., microprocessor) is running code (e.g., application code). This area of power reduction has not been addressed as an area of power savings, as frequently as the other two approaches described above.

This area of power reduction is a function of logic gates in the microprocessor making transitions from low to high values (e.g., "0" to "1"), or high to low values (e.g., typically called "node toggle"), so as to render a binary value. Conventional analysis techniques have attempted to minimize node toggle by function. Hence, if an "add" subroutine is to be performed, the add is attempted with the minimum amount of toggle. Specifically, to minimize the amount of toggle, the conventional technique selects an adder-type (e.g., a ripple adder, carry adder, etc.) to be employed which would minimize the transitions to get the result.

Within the microprocessor, control signals control the actual processing in the microprocessor. For example, these signals are carried on control lines which may activate parallel conductors (e.g., buses) so that data placed on them will flow to the proper destination. The control lines supervise the order which microinstructions are performed after the opcode has been decoded by logic circuitry. Using clock inputs, the control circuitry maintains the proper sequence of the processing task. The control signals enable the various device functions which can be active high or active low.

However, a problem with the conventional approach is that from cycle to cycle, the control signals are not linked (e.g., examined in relation to one another). Hence, the control signals do not "look backward" to a previous cycle's function, but instead the control signals are treated independently. For example, if a previous cycle is an "ADD" instruction, and the next cycle is a "MULT" instruction, then each opcode (e.g., operation code instruction in binary representation) will have its own specific control signals (e.g., control signals designating an "ADD" and separate, different control signals designating the "MULT"). Typically, there will be a defined state (e.g., a "0" or "1" state) for every control signal for every opcode. Thus, a binary representation is provided of the control signal to execute the control signal's particular function. These states are not defined by the prior opcode, but strictly from the executing opcode (e.g., the opcode's function).

Two common techniques for decoding are distributed decode and microcode.

Referring to FIG. 1, the distributed decode approach is where each logic signal is derived in a section of logic description completely. Specifically, in FIG. 1, random logic gates are shown (e.g., the gates may be AND, OR, etc. gates). Each of the random logic gates issues an individual signal.

Thus, in a design unit employing the distributed approach, each logic signal is derived in a section of logic description completely. The design unit becomes a series of individual decodes of control signals in which the sum total of the individual decodes represents the opcode's function. This approach is advantageous since, for each control function, a relatively small amount of code can be written that represents that opcode's function. Thus, FIG. 1 illustrates the conventional splintered, random decode of instructions.

However, with this approach, it is difficult to read/debug any one opcode function, since the function is spread out over a very large design unit. Further, it is difficult to perform engineering change (EC) and to view the entire opcode function.

An alternative conventional approach is a microcode approach which is shown in FIG. 2. In the microcode approach, a system 20 is provided in which each opcode is translated from an entry point address (e.g., instruction register (IR) 21) to a microcode read-only memory (ROM) 22 (or to a programmable logic array (PLA) (not shown)). A complete set of control signals 23 is output from the ROM 22/Programmable logic array (PLA). The control signals of the set typically are output simultaneously.

Hence, for every opcode, one set of control signals is available. This feature enables the designer to perform the engineering change (EC) function quickly since only the control signals need be edited at a localized address which represents that opcode. Thus, the microcode approach is easier to read and to define opcodes.

The disadvantages of the microcode approach include that there is no flexibility (e.g., only a fixed value of "0" or "1" is provided), it has a limited function, and is relatively slow as compared to the distributed approach.

Thus, both of these approaches have disadvantages and neither approach optimizes performance and utility of the system.

Hence, currently, there is no means or method of knowing all possible opcode combinations, and then, based upon this knowledge, selecting the next state to minimize the next cycle power but yet without impacting the cycle's function. Instead, the conventional techniques perform a full ON/full OFF from one cycle to the next, thereby consuming much power.

SUMMARY OF THE INVENTION

In view of the foregoing and other problems of the conventional methods and structures, an object of the present invention is to provide a method and structure for reducing AC power by deriving the next cycle's control signals based on the next cycle's function along with the previous cycle state.

Specifically, the present inventors have discovered that large unnecessary node toggle swings can occur based on what is in the pipeline last (e.g., the previous cycle's function), and what is in the pipeline next (e.g., the next cycle's function).

In one aspect of the present invention, a microprocessor is provided which includes a microcode unit for outputting control signals, for each of a plurality of instructions, required by the microprocessor for executing the instructions.

Preferably, the microcode unit includes an instruction address input for receiving an instruction address, a control variable input for receiving a control variable corresponding to a current state of the microprocessor, a control signal input for receiving all the control signals output by the microcode unit for an immediately preceding instruction, and a plurality of embedded logic circuits each dedicated for evaluating one unique type of instruction received by the microcode unit.

In another aspect of the present invention, a method updating a design of a semiconductor chip at a hardware description language (HDL) of simulation, includes steps of automatically reading and setting a value of control signals on a per cycle basis in a template and updating the HDL design with new data, changing a first predetermined value of the template to be set with the previous state of the control signal, and executing a test sweep to determine "don't care" states of control signals.

In yet another aspect, a signal-bearing medium is provided for storing a program for executing the method of the invention.

With the unique and unobvious aspects, features and advantages of the present invention, the present invention reduces AC power by deriving the next cycle's control signals based on the next cycle's function along with the previous cycle state. Thus, node toggle swings are minimized, thereby to save power and extend battery life for mobile computer and communications applications.

Thus, a primary advantage is that control signals are controlled to reduce node toggle. Specifically, the microprocessor does not toggle until it has to do so, thereby resulting in reduced power, longer battery life, and lower thermal dissipation with resulting less concerns about heat-sinking and the like.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
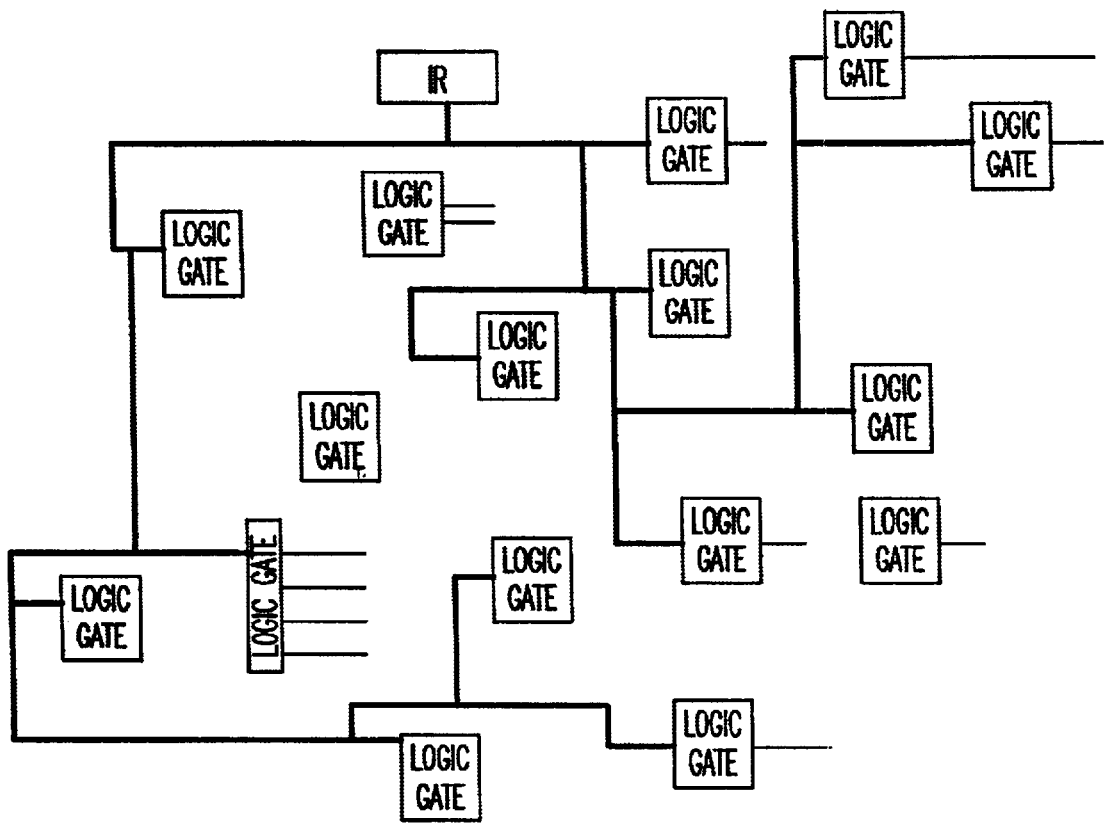
FIG. 1 illustrates a conventional decode technique and more particularly a distributed decode technique.
Figure 2:
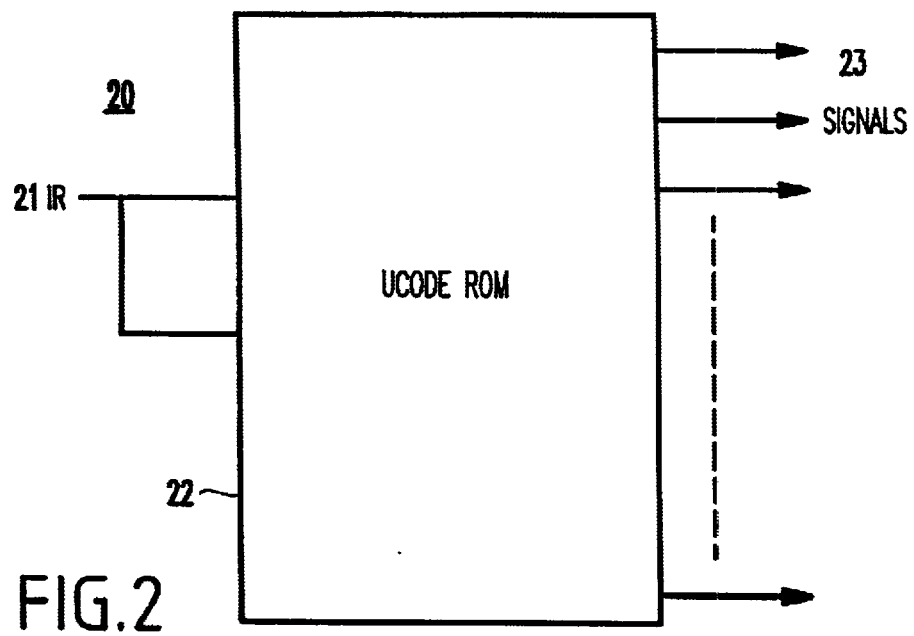
FIG. 2 illustrates another conventional decoding technique and more particularly a microcode technique.

Referring now to the drawings, and more particularly to FIGS. 3A–5, there are shown preferred embodiments of the method and structures according to the present invention.

Regarding a first embodiment of the present invention, the inventive microprocessor design uses a decode method that differs from conventional microprocessors.

First Embodiment

Specifically, as shown in FIGS. 3A–3D, the present invention provides a hybrid unit that combines the advantage of microcode, and the ability to execute control and engineering change as random logic. The present inventors have termed their inventive design technique as "pseudo microcode".

Generally, the present invention emulates a microcode ROM and generates a unique microcode address for each control signal. The opcode instruction (control signal) is sent to microcode units and each of the microcode units looks at (examines) the control signal. The microcode units change the instruction accordingly.

Thus, each of the microcode units look at the control signal and query whether its address is currently on the bus and whether the individual microcode unit is the line which the bus wants. If "yes", there is a match and then the control signal is defined and set to a "0", a "1" or kept to a previous value. By being able to keep the control signal to a previous value, less transitions can be made, thereby leading to power conservation.

Figure 3A:
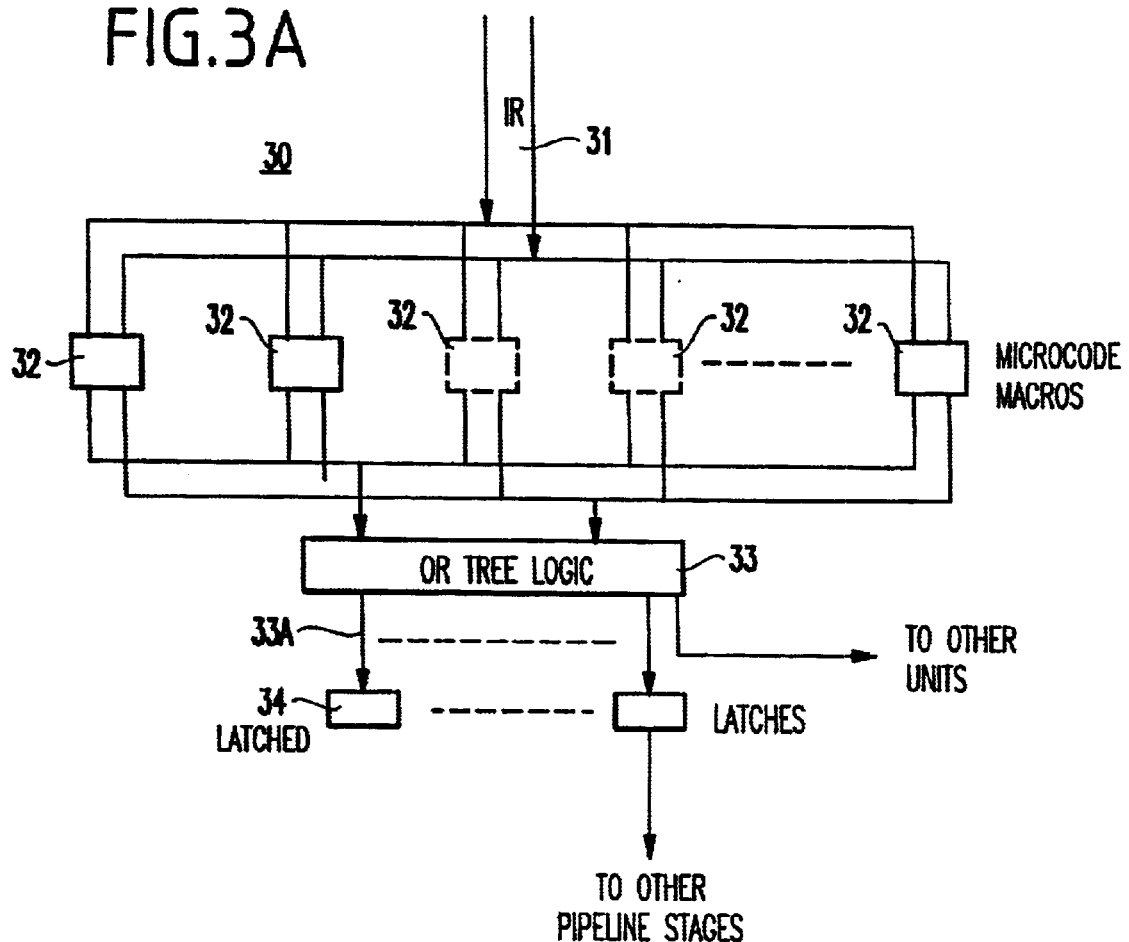
FIG. 3A illustrates a structure according to a first embodiment of the present invention.
Figure 5:
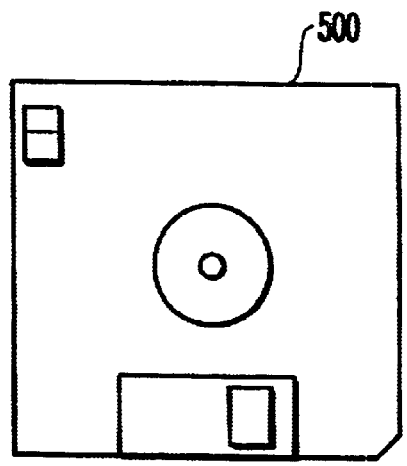
FIG. 5 illustrates a medium for storing a program for implementing the method according to the present invention.

In FIG. 3A, a system 30 and method according to the present invention are shown. Specifically, for every opcode, every control signal that can be set by any opcode is bundled together as a "total identity", including the pipeline control, the address generation control, and the execute control bits.

First, a first-stage generated microcode entry point address dispatched from instruction register IR 31 is sent to n microcode units 32. While exemplarily there are five microcode units shown in FIG. 3A, many more (or less depending on the design) may be provided. For example, there are 22 microcode units in an exemplary design.

Within each microcode unit 32, the microcodes are decoded to determine the instruction type.

Specifically, the decoding operation includes decoding of the operands of the incoming microcode, and then comparing, on a bit-by-bit basis, the decoded operands with known bit patterns (e.g., stored in a table lookup, database, etc.), thereby to determine an instruction-type. For example, a first bit pattern may represent an "ADD" instruction, a second bit pattern may represent a "MULT" instruction, a third bit pattern may represent a "STORE" instruction, and so forth for any supported instruction type.

Figure 3B:
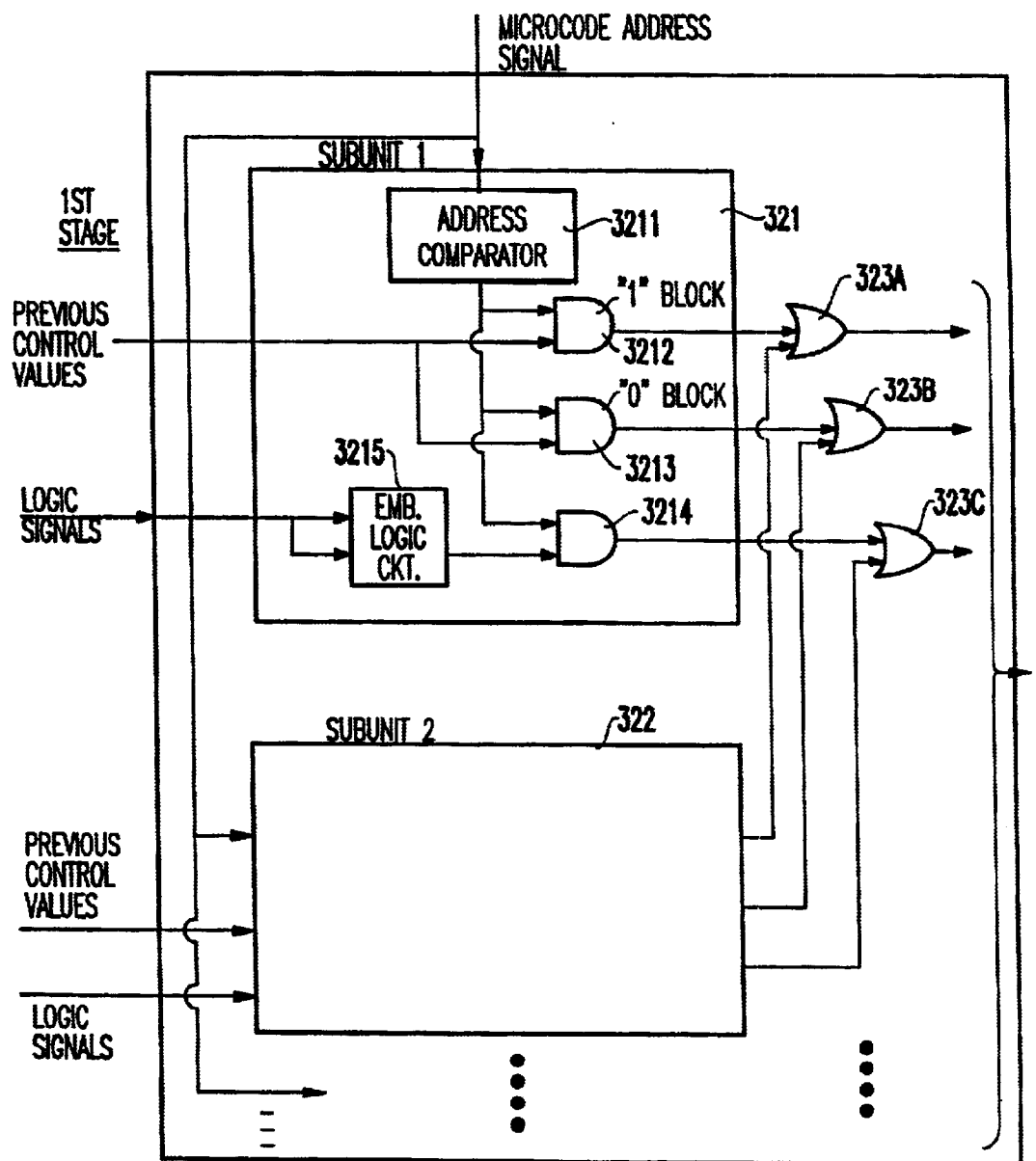
FIG. 3B illustrates a structure of a microcode unit 22 for use in the structure according to the first embodiment.

A preferred structure of the microcode unit 32 is shown in FIG. 3B, in which the exemplary microcode unit may include one sub-unit or a plurality of sub-units 321, 322, etc. If a plurality of microcode sub-units are provided, internal or external OR gate(s) 323A, 323B, 323C etc. may be included for providing a single output to OR Tree Logic 33 described below. Once again, while the OR gate(s) 323A, 323B, 323C, etc. are shown as internal to the microcode unit 32, such OR gates may be provided externally thereto and the same function can be performed and the same advantages may be obtained.

In FIG. 3B, a microcode address entry point is shown for receiving a microcode address. The address is provided, for example, to each of a plurality of sub-units (if so equipped). Sub-unit 321 will be examined as an exemplary one of microcode unit 32. The microcode address is input to an address comparator 3211 which compares the address input with the address for the microcode unit 32, to determine whether the microcode unit is active.

For example, if the addresses match, the address comparator will issue a signal having a high value (e.g., a "1", whereas if the addresses do not match (and thus the unit is not active) the address comparator will issue a signal having a low value (e.g., a "0"). The output signal of the address comparator 3211 is issued to AND gate 3212 (e.g., for the "1" block), AND gate 3213 (e.g., for the "0" block) and to AND gate 3214.

Further, the previous control values are examined by being input to second inputs of AND gates 3212 and 3213 which provides an output accordingly depending upon a change of value of the control signal from the previous cycle to the present cycle.

Additionally, embedded logic signals in the microcode are considered. Specifically, the logic signals are input to an embedded lock circuit (block) 3215, which in turn provides an output to AND gate 3214 which performs an AND operation between the output of the address comparator and the output of the logic circuit 3215.

The plurality of outputs from AND gates of each of the microcode subunits 321, 322, etc. are input to respective ones of internally or externally provided OR gate(s) 323A, 323B, 323C, etc. (or directly to the OR tree 33, shown in FIG. 3A, depending upon the number of outputs to be OR'd) which ORs the inputs to provide a single output from the microcode unit 32.

Specifically, in the example shown, an output from AND gate 3212 is provided to a first input of an OR gate 323A and an output from a corresponding AND gate (not shown) in microcode subunit 322 is provided to a second input of OR gate 323A, to provide an output. Similar inputs are made to OR gates 323B and 323C, which in turn are OR'd, ultimately to provide a single output from the microcode unit 32. As evident, while the OR gates 323 are shown as internally provided, such OR gates 323A, 323B, 323C, etc. may be externally provided, so long as a single output is generated corresponding to each microcode unit and input to the OR logic tree 33.

Thus, the single output is provided to the OR tree logic 33 shown in FIG. 3A. Similar operations are performed for the other plurality of microcode units 32.

Once the instruction type is determined (e.g., ADD, STORE, MULT etc.), then the value is set by that portion of the microcode unit that includes the microcode portion, for every control signal within that microcode unit 32 for that cycle.

A key feature of the invention is that, in addition to the "0" or "1" value which can be set for each control signal, the previous value can also be set. The capability of setting the previous value is a key aspect to reducing the power within the microprocessor.

Specifically, since each function is a function of a microcode address, by only changing the value of control signals that are absolutely required for that particular microcode address (e.g., ADD, STORE, MULT etc. as determined by the decoding), the power of the microprocessor can be minimized since node toggle, as discussed above, is greatly reduced as compared to the conventional machines and systems. For example, in an exemplary design, the power savings was on the order of about 30–40% over the conventional systems. Hence, if the function remains the same from a previous opcode to the next opcode (and hence from cycle-to-cycle), then the previous value may be maintained again, and no node toggle results since values are not being changed from high to low or from low to high.

Thus, with the invention, each opcode becomes a function of the previous opcode. Only conflicting (e.g., required) control signals must be resolved, and thereby power consumption is greatly reduced.

An example is provided below in which:
EX: Add
  Nop (looks like ADD, but register enable is off)
  Sub (looks like ADD), but ALU Control and turn register enable back on)
  Nop (looks like SUB, but register enable off)
  Mult (looks like SUB, but register off, MULT control on)
  etc.

Specifically, in the above example, first in the Add operation, all the control signals for the ADD are generated. Then, in the first Nop operation, since this control signal appears like an ADD, all the ADD signals can be kept the same as in the ADD operation. However, for registers provided for latching the result, the register enable is turned off/maintained off.

Then, in the Sub operation, this operation appears as an ADD (and thus all ADD signals may be kept the same as before), but an arithmetic logic unit (ALU) control is performed to turn the register enable back on. In the second Nop operation, this control signal's operation appears as a SUB control signal (and thus all SUB signals may be kept the same) but the register enable is turned off.

Finally, in the Mult control signal, this signal appears as a SUB (and thus all SUB signals may be kept the same), but the register is turned off and the MULT control register is turned on.

Thus, from control signal to control signal (and from function to function) the transitions may be minimized by changing only those signals which must be changed and maintaining control signals at the previous level if no change is required. Hence, if the microcode matches the address, the control signal is set to "0", "1" or the previous value of the signal.

Thus, in operation, for every opcode, every control signal that can be set by any opcode is bundled together as a "total identity". This includes the pipeline control, the address generation control, and the execute control bits. Upon each cycle boundary, a first stage generated microcode entry point address is sent to n microcode units 32. The microcodes are decoded in each microcode unit for determining the instruction type. As mentioned above, the structure of the microcode units 32 is shown in FIG. 3B.

Once the instruction type is determined, then the value is set for every control signal within that macro(microcode). In addition to the "0" or "1" value, the previous value also can be set. Thus, with the invention, each opcode becomes a function of the previous opcode. Only conflicting control signals must be resolved, thereby achieving great power savings.

With this method, the control signals for each unit are locked down (e.g., "set"), and only change when their function would interfere with the current opcode being executed.

Another advantage to the inventive "pseudo microcode" technique is its ability to include embedded logic within the microcode (and receive embedded logic signals within the logic block of the microcode unit 32 shown, for example, in FIG. 3B. Such embedded logic reduces the number of microcode addresses.

Figure 3C:
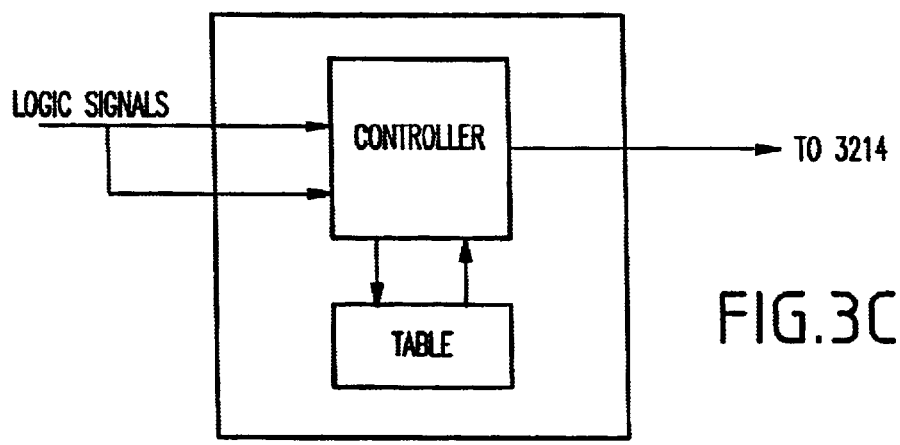
FIG. 3C illustrates a structure of an embedded logic circuit of the microcode unit 32.

Specifically, referring to FIG. 3C a plurality of embedded logic circuits 3215 may be provided within the microcode units 32 shown in FIG. 3B.

Each of the embedded logic circuits 3215 may include, for example, a table 32151 for performing a table lookup in response to a received instruction, and a controller responsive to a control variable (e.g., in the logic signals), the control signals (e.g., the logic signals shown in FIG. 3C) for an immediately preceding instruction, and to an output from the table lookup for controllably setting each of the control signals required by the microprocessor for executing the received instruction.

The controller of the embedded logic circuits can set a control signal to a predetermined value (e.g., a "1") regardless of its immediately preceding value, or can set a control signal to another predetermined value (e.g., a "0") regardless of its immediately preceding value, or can simply not modify a control signal from its immediately preceding value. Moreover, the controller can set a control signal to a data state.

The embedded logic (e.g., functions) represents conditional checks for a particular opcode, where depending upon the value of the input control signals being set, the value of the output control signals can be set to different values. The ability to perform/execute embedded logic is a hybrid of a conventional microcode. The conventional microcode cannot perform embedded logic because it is a read-only memory. Hence, ROMs cannot embed logic. The end result of using embedded logic in the pseudo microcode is a reduced number of microcode addresses. For example, if on average, two to three embedded functions exist, then the microcode must increase to many times its size to accommodate all the potential values.

Additionally, each opcode could be checking a different control signal for its embedded logic, making the microcode possibility beyond the scope of a comprehensive implementation (e.g., the microcode performing the complete function).

A third advantage of pseudo microcode is the ability to pass a variable to the microcode control variable. For example, this may be in the form of execute_add[4:0]"=IR [4:0]". These variables are typically generated within other control units within the microprocessor.

Since this is a simulated microcode, the control signals are not hardwired, but can be set to "0", "1", or some other control variable.

A key element of the simulated microcode (e.g., the simulated microcode passed to the units 32), is that the control signals from all of the microcode units) must be re-combined to form a single set of control signals. It is noted that each control block/microcode unit includes a complete set of control signals. As described, there are n number of these microcode units 32 (e.g., 22 for an exemplary design), each with their own set of control signals.

Returning to FIG. 3A, to recombine the signals, an OR logic tree (or set of OR logic trees 33 depending upon the design) is provided which takes n number of the control signals and ORs them into a s ingle identity (e.g., output) 33A. The "single identity" output 33A of the OR Tree Logic 33 is the final control signal which is output to another unit in the microprocessor, or latched by a latch 34 for the next pipeline stage. Thus, the OR tree recombines the control signals into a single output.

Figure 3D:
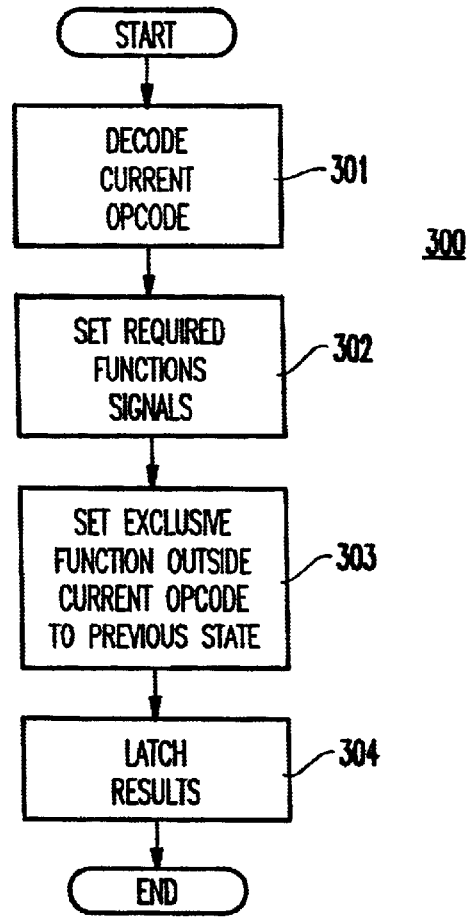
FIG. 3D illustrates an exemplary flowchart of the operation of the first embodiment according to the present invention.

An exemplary operation of the first embodiment is shown in FIG. 3D which illustrates a flowchart showing the state machine decoding operation 300.

Briefly, in FIG. 3D, in step 301 the current opcode is decoded. Specifically and as mentioned above, the decoding operation for the current opcode includes decoding of the operands of the incoming opcode, and then comparing, on a bit-by-bit basis, the decoded operands with known bit patterns (e.g., stored in a table lookup, database, etc.), thereby to determine an instruction-type. For example and as mentioned above, a first bit pattern may represent an "ADD" instruction, a second bit pattern may represent a "MULT" instruction, a third bit pattern may represent a "STORE" instruction, and so forth for any supported instruction type. Thereafter, in step 302, the required function signals are set.

In FIG. 303, the exclusive function outside the current opcode is set to the previous state. Finally in step 304, the results are latched.

Thus, in the first aspect of the invention, the present invention provides a microcode address entry point providing a simulated microcode function that allows the power control and reduction, embedded logic, passing of variables and greatly improved readability, thereby resulting in a design having lower power consumption and more flexible design structure.

Thus, unlike the conventional methods and systems in which power is controlled on a full ON/full OFF type of mode, the microprocessor and method of the present invention controls the dynamic execution of logic. As a result, power allocation can be based on current system needs and program execution. More particularly, allocation takes account the specific needs of portable personal computers (PCs) and other portable communications devices.

Hence, in the inventive "Pseudo Microcode" approach, the IR and control signals form the microcode address entry point that functions as an entry address into the random logic structure. Every opcode and microcode function is fully specified, and every control signal exists for every microcode function. A key aspect of the invention is that the signals may be set to the "0" state, the "1" state or to another signal's (e.g., a previous signal's) state. The signal can be set to a desired state depending upon the entry into a particular opcode. Logic (e.g., standard verilog function) may be embedded within an opcode (e.g., so-called "embedded logic") to determine what state to set the function. Further, the inventive structure supports state machine decode functions.

Thus, the microprocessor design according to this aspect of the invention preferably includes a plurality of microcode/decode units, a mechanism for setting selected control signals to their previous values (e.g., in a pipeline), and embedded logic included within the decoders which perform conditional checks for a particular opcode to reduce the number of addresses thereof, and a mechanism for passing a variable to a microcode unit. Thus, the invention determines which controls signals need not be modified for each instruction and thereby significant power savings results, thereby optimizing portable devices.

Second Embodiment

As described above with regard to the first embodiment, the method of reducing power relies on turning the microcode sequence into a giant state machine in which each opcode is a function of the immediately preceding opcode. Hence, every opcode will maintain the previous control signals to a previous state, and will change only the control signals required for the current cycle's operation.

However, the determination of this new state machine is based on an architecture specification with the designer looking at the function, and determining what control signals could be left at the previous state, and what control signals could be changed to new values.

Thus, a problem with the first embodiment is that such a determination and changing values of selected ones of the control signals are performed manually and require human inputs. Once the function is implemented, large test case fallout occurs. To fix the failures, the designer must perform a difficult and tedious debug operation including analyzing each failure, and undoing the changes. This very time-intensive debugging impacts the design schedule, and represents a significant portion of the total engineering resources.

Furthermore, in addition to the design errors, a significant amount of power is still consumed due to the designer missing (e.g., overlooking) signals that could have been held to previous values. Thus, node toggle still occurs in some instances where such node toggle could have been avoided altogether. Hence, some power is still wasted and unnecessarily consumed.

Due to these problems, an alternative method of creating the state machine control logic has been developed by the present inventors and is described below as the second embodiment of the present invention with reference to the flowcharts of FIGS. 4A–4B.

Thus, the second embodiment is termed an "Auto_Don't_Care (ADC)" method which automates the finding of bits which need not toggle (e.g., automates finding of "Don't_Care_Bits"), and frees the designer from having to do a manual search for such bits. The time savings is significant, reducing the time of debug from months (e.g., by human) to hours/days (e.g., by the inventive program). The program also allows for automated debug.

Specifically, the inventive microprocessor design has chosen a decode method that is a structured design approach. For every opcode boundary, every control signal is specified in the design.

The first stage of decode is an entry point address into the explicit microcode for a given operation. A High Level Logic Entry (HLLE) code exists which allows the reading and setting of every control signal for every function on a per-cycle basis.

Figure 4A:
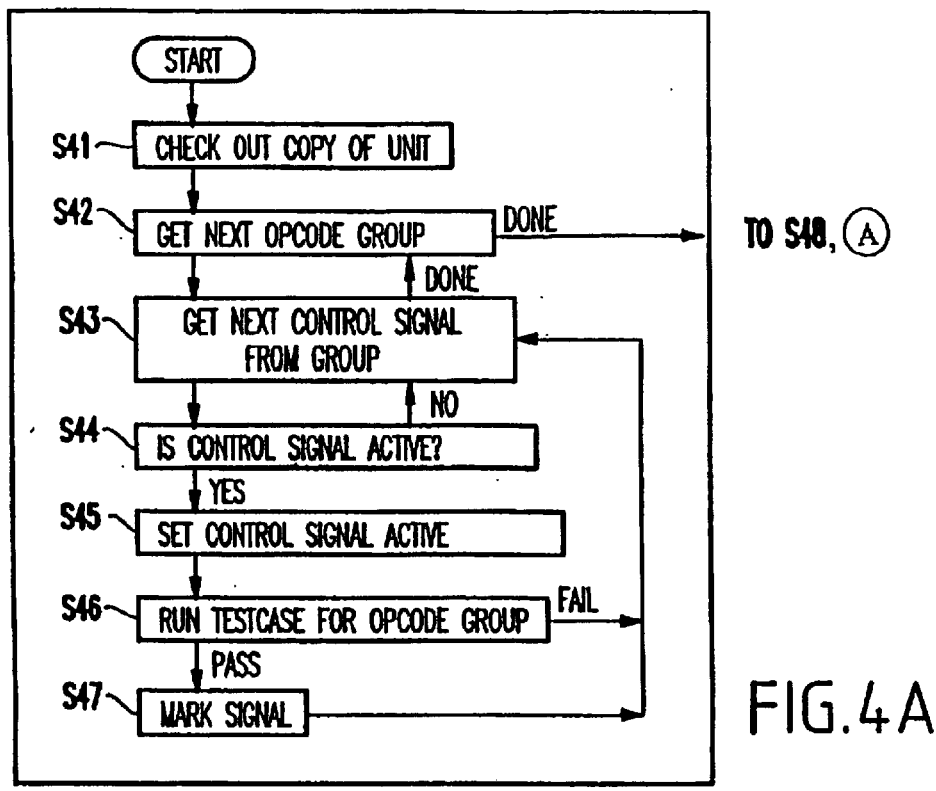
FIGS. 4A and 4B illustrate a flowchart according to a method of a second embodiment of the present invention.

As shown in FIG. 4A, the first step of the Auto_Don't_Care (ADC) process is to provide a template for every function type (e.g., Add, Sub, Mult, etc.) within the processor. The template may be as described above (e.g., "(y, y, y)" such as (0, 1, previous value), and may be a copy (e.g., a temporary or checkout copy) of the microcode itself such as for a Mult operation there is a specific microcode for the function.

The template can be updated as the design specification on a per-cycle basis. The HLLE updates the hardware design language (e.g., source verilog) with the new template data, and the model can be re-run to verify the results.

With the template format, the ADC starts at the first function boundary (e.g., in the exemplary inventive microprocessor design, there are approximately 350 function templates; that is, approximately 26 microcode units multiplied by approximately 15–17 functions for each unit), and reads the current functional template (e.g., obtains the next opcode unit in step S42) from the source verilog.

In step S43, a control signal is obtained from the opcode group, and in step S44 it is determined if the control signal is active.

If the control signal is not active as determined in step S44, the process loops back to step S43 to obtain the next control signal from the opcode group. Ultimately, a control signal is found (either from the present opcode group or from the next opcode group(s)) which is active.

Then, in step S45 of FIG. 4A, the first non-zero value of the template is changed to be set to the previous cycle's state of the control signal (e.g., active). Then, the Auto_Don't_Care method searches the database (e.g., table, etc.), to locate all tests that have this function (e.g., the function of the control signal), and creates a test sweep (e.g., as shown in step S46 described below).

In this way, the process modifies the design so as to always set in the current cycle all control signals input to their active values. The purpose of such a step is ultimately to set the control bits of an opcode which does not change (e.g., has no affect) to a "don't care" value.

Hence, the new template (e.g., the modified design) updates the temporary copy of the updated microcode function block, and then, as shown in step S46, a test sweep is run with the previous state set for the one control signal being examined currently.

As shown in step S47, if the test sweep passes (e.g., does not fail), the control bit (e.g., control signal) is identified/marked as a potential "don't care" value.

When the test sweep is run, the HLLE modifies the high level, and enables the logic that forces the previous signal feeding the logic to be in the true state to simulate a worse case condition for that control bit.

In steps S46 and S47, the HLLE examines and processes each control bit, setting each one individually, and running the test sweep automatically, to keep (e.g., maintain), as they are, the control bits that are found to be "don't care" and not setting function-critical signals.

Figure 4B:
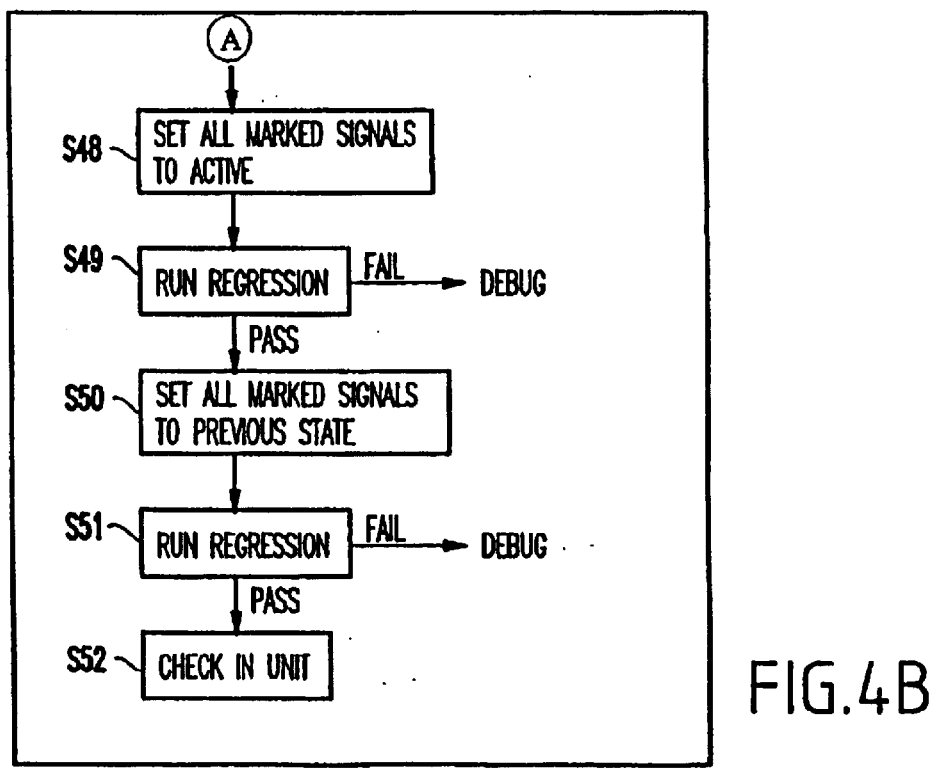

When the template has been fully swept on a per-bit basis for all control bits of the control signals from an opcode group and when all opcode groups have been examined, then all valid "don't care" bits are set to active, as shown in step S48 of FIG. 4B.

Then, in step S49, the test sweep is re-run again (e.g., a final time) to ensure that there is no bit-to-bit interconnections which may cause failures or the like in the design. Essentially, the regression is a List (or set) of architectural test cases which are supplied to verify the microprocessor design. If the results of the regression run in step S49 indicate a "fail", then debugging is performed (e.g., by the program or by a human designer).

If a "pass" results from the regression, the process continues to step S50. In step S50, the function count is incremented by "1", and the new template is created, tests found, and the analysis is completed.

Once the function count reaches the maximum value (e.g., representing that all functions have been examined), then every function type will have been updated with the previous control signal, as shown in step S50.

Then, all of the templates are executed on the microcodes together with each other. Again, the HLLE ensures that the previous control signals are always in the true state (e.g., overrides values).

In step S51, a full regression analysis is executed to ensure that the opcode function still functions with the automatically-generated "don't care" verilog (e.g., with the "don't care bits set). As mentioned above, the regression is a list (or set) of architectural test cases which are supplied to verify the microprocessor design. If the regression fails, then debugging by the designer (or automatically by the program) may be performed accordingly.

Conversely, if the full sweep again passes (as previously determined after step S49) even with the automatically-generated "don't care" values, then the new verilog (e.g., the temporary copy of the opcode) becomes the official release design, in step S52. Thus, if the regression result indicates a "pass", then the master copy is updated based on the (new) temporary copy.

Additionally, in step S52, the templates are printed in a readable format so that a complete documentation exists on a function-by-function basis of true "0s", true "1s", and previous "don't care" function on a bit-by-bit basis.

Thus, the second embodiment modifies the design to always set in the current cycle all control signals input thereto, to an active value, and then the program automatically starts setting one control bit/control signal at a time to find candidates for "Don't Care" bits (e.g., maintaining previous cycles values so as to avoid node toggle). Specifically, the control signals are set to active, and a test case is run to find candidate/potential "don't care" bits (assuming the test case for the opcode group passes).

Hence, the control signals are set to active, placed into a temporary data set, and a test case is run. If the opcode does not fail then the control signal is marked as a potential "don't care" bit. This process continues for all control bits and then the test case is run again. Assuming another "pass", all of the control bits (signals) in question are set to "don't care" and the master copy is updated based on the temporary copy.

Hence, in the second embodiment of the present invention, the "Auto Don't Care" (ADC) method of updating the verilog (or VHDL) design performs an analysis and verification far beyond a human designer's capabilities. ADC maximizes the amount of logic that can be connected to the previous state, and still ensure complete functionality. The end result is a significant power savings on a global chip level.

It is noted that the method of the second embodiment may be implemented, for example, with the structure of FIGS. 3A–3C of the first embodiment.

Hence, hitherto the present invention, power was controlled on a full ON/full OFF type of mode. The ability to control the dynamic execution of logic did not exist prior to the present invention. With the invention, power allocation can be based on current the specific needs of portable personal computers (PCs). More particularly, allocation takes into consideration system needs and program execution. Hence, the present invention will find great benefit in microprocessors.

Thus, with the second embodiment of the present invention, a state machine control is performed such that every opcode sets the current cycle control bits based upon function and the prior opcode control signals. A key aspect and objective of the second embodiment is to only change control signals whenever conflict exists and to do so automatically. For state machine decode operation, the current opcode is decoded, required functions signals are set, exclusive functions outside the current opcode are set to the previous state, and the results are latched.

Hence, as compared to the conventional techniques which require manual definition from the user's specification, was error-prone and incomplete, the present invention is greatly superior. More specifically, comprehensive coverage is provided, significant power reduction is achieved, and design time is greatly reduced due to less debugging being required.

Thus, the present invention tests the design with control signals of previous state to determine "don't care" states, and the design can be modified to minimize the state transitions of the control signals based on the previous control signals. Hence, the invention provides an easy-to-read structure having easy engineering change and a flexible format, and which supports "Don't Care" functions and complex instruction sets, with fast logic and low power.

Further, while the present invention has been described primarily in terms of software or software/hardware configuration, the same or similar functions could be implemented in a dedicated hardware arrangement.

In addition to the hardware/software environment described above, a different aspect of the invention includes a computer-implemented method for reducing power. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform a method to perform a process of reducing power.

This signal-bearing media may include, for example, a random access memory (RAM) such as for example a fast-access storage contained within the computer. Alternatively, the instructions may be contained in another signal-bearing media, such as a magnetic data storage diskette 500 shown exemplarily in FIG. 5, directly or indirectly accessible by the computer.

Whether contained in the diskette, the computer, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a suitable language.

While the invention has been described in terms of several preferred embodiments, those skilled in the art will recognize that the invention can be practiced with modification within the spirit and scope of the appended claims.

What is claimed is:

1. A method of updating a design of a semiconductor chip at a hardware description language (HDL) level of abstraction, to maximize an amount of logic that is set to a previous cycle state, the method comprising:
    automatically reading and setting a state value of control signals on a per-cycle basis in a template and updating the design in HDL with new data;
    changing a first predetermined value of the template to be set to the previous cycle state of the control signals; and
    executing a test sweep to determine a "don't care" state of the control signals.

2. the method according to claim 1, wherein said first predetermined value comprises a first non-zero value.

3. The method according to claim 1, wherein said "don't care" state indicates a state at which a respective control signal of said control signals maintains a value from its previous cycle.

4. A signal-bearing medium tangibly embodying a program of machine readable insurrections executed by an apparatus to perform a method of updating a design of a semiconductor chip at a hardware description language (HDL) level of abstraction, to maximize an amount of logic that is set to a previous cycle state, said method comprising:
    automatically reading and setting a value of control signals on a per-cycle basis in a template and updating the HDL design with new data;
    changing a first predetermined value of the template to be set to the previous cycle state of a control signal; and
    executing a test sweep to determine a "don't care" state of the control signals.

* * * * *